(12) United States Patent
Demeuse et al.

(10) Patent No.: US 12,315,416 B2
(45) Date of Patent: May 27, 2025

(54) METHOD AND SYSTEM FOR PRESENTING DIGITAL ART IMAGES ON DIGITAL ART FRAMES WITH ELECTRONIC PAPER DISPLAYS

(71) Applicant: INKcoming, La Hulpe (BE)

(72) Inventors: Mathieu Demeuse, Céroux (BE); Charlotte Dubois, Céroux (BE)

(73) Assignee: INKcoming SA, La Hulpe (BE)

( * ) Notice: Subject to any disclaimer, the term of this patent is extended or adjusted under 35 U.S.C. 154(b) by 70 days.

(21) Appl. No.: 18/019,844

(22) PCT Filed: Jul. 26, 2021

(86) PCT No.: PCT/EP2021/070899
§ 371 (c)(1),
(2) Date: Feb. 6, 2023

(87) PCT Pub. No.: WO2022/028939
PCT Pub. Date: Oct. 2, 2022

(65) Prior Publication Data
US 2023/0282148 A1 Sep. 7, 2023

(30) Foreign Application Priority Data
Aug. 6, 2020 (EP) ..................................... 20189841

(51) Int. Cl.
*G09G 5/10* (2006.01)
*G09G 3/20* (2006.01)
*G09G 3/34* (2006.01)

(52) U.S. Cl.
CPC ......... *G09G 3/2044* (2013.01); *G09G 3/2059* (2013.01); *G09G 3/344* (2013.01);
(Continued)

(58) Field of Classification Search
CPC ............... G09G 3/2051; G09G 3/2044; G09G 2360/16; G09G 5/10; G09G 3/34;
(Continued)

(56) References Cited

U.S. PATENT DOCUMENTS

| 9,245,485 B1 | 1/2016 | Hu |
| 2008/0309953 A1 | 12/2008 | Feng |

(Continued)

FOREIGN PATENT DOCUMENTS

| JP | 2012-186825 | 9/2012 |
| JP | 2013-187846 | 9/2013 |
| KR | 10-2016-0016765 | 2/2016 |

OTHER PUBLICATIONS

European Search Report and the European Search Opinion Dated Feb. 9, 2021 From the European Patent Office Re. Application No. 20189841.8. (11 Pages).

(Continued)

*Primary Examiner* — Hau H Nguyen

(57) ABSTRACT

System for presenting a digital art image comprising a server (1) and a digital art frame (2), wherein the digital art frame (2) comprises an electronic paper display, wherein the digital art frame (2) comprises a mounting means configured to fix the digital art frame (2) on a wall, wherein the server (1) is configured to store a plurality of dithered digital art images, wherein the processed digital art images have the same number of intensity levels as the electronic paper display (21), wherein the processed number of intensity levels is at least four, wherein the system is configured to transfer one of the processed digital art images to the digital art frame (2) and to display the transferred processed digital art image on the electronic paper display (21).

22 Claims, 3 Drawing Sheets

(52) U.S. Cl.
CPC .  *G09G 2340/0492* (2013.01); *G09G 2354/00* (2013.01); *G09G 2370/022* (2013.01); *G09G 2370/16* (2013.01); *G09G 2380/16* (2013.01)

(58) Field of Classification Search
CPC ................ G09G 3/2059; G09G 3/344; G09G 2340/0492; G09G 2354/00; G09G 2370/16; G09G 2380/16
See application file for complete search history.

(56) References Cited

U.S. PATENT DOCUMENTS

| 2010/0295866 | A1* | 11/2010 | Ishii | H04N 9/3123 |
| | | | | 345/597 |
| 2015/0194101 | A1* | 7/2015 | Yaras | G09G 3/3426 |
| | | | | 345/593 |
| 2019/0361694 | A1 | 11/2019 | Gordon et al. | |

OTHER PUBLICATIONS

International Search Report and the Written Opinion Dated Jan. 18, 2022 From the International Searching Authority Re. Application No. PCT/EP2021/070899. (17 Pages).

Notice of Submission of Opinions Dated Jan. 2, 2025 From the Korean Intellectual Property Office Re. Application No. 10-2023-7007713 and Its Translation Into English. (12 Pages).

\* cited by examiner

METHOD AND SYSTEM FOR PRESENTING DIGITAL ART IMAGES ON DIGITAL ART FRAMES WITH ELECTRONIC PAPER DISPLAYS

RELATED APPLICATIONS

This application is a National Phase of PCT Patent Application No. PCT/EP2021/070899 having International filing date of Jul. 26, 2021, which claims the benefit of priority of Europe Patent Application No. 20189841.8 filed on Aug. 6, 2020. The contents of the above applications are all incorporated by reference as if fully set forth herein in their entirety.

FIELD AND BACKGROUND OF THE INVENTION

The present invention relates to a method and system for presenting digital art images on digital art frames with electronic paper displays.

Digital photo frames or digital art frames are known in the prior art. They can be mounted on the wall or put on a table and display photos selected by a user. Most of those digital art frames use light emitting displays like LCD, OLED, etc. which consume energy during the presentation of the images. This creates a significant energy consumption. This increases the ecological footprint of these devices. In addition, they require either a fixed power supply by a cable which makes the mounting process complicated or regular charging which is cumbersome for the users. Therefore, it is suggested to use electronic paper displays in digital art frames like in U.S. Pat. No. 9,443,368 or in TWM388267. The electronic paper display solves all problems with the energy consumption as the electronic paper display consumes only energy for changing the displayed imaged and not for the time of the displaying itself. This allows to use battery driven digital art frames for a very long time without recharging. However, the currently best electronic paper displays can display only sixteen grey intensity levels, i.e. only 4-bit images. Thus, photos displayed on the digital art frame with electronic paper displays show artifacts and are not acceptable by consumers as a digital art frame. This explains why the use of electronic paper displays have been theoretically discussed, but have practically never been used, except for some limited cases of less complex documents as in U.S. Pat. No. 9,443,368 which displays certificates.

In other application fields of electronic paper displays, dithering of the displayed image is used. In U.S. Pat. No. 8,878,880, the dithering is performed in the electronic display device itself. Dithering performed on a server as a pre-processing of images displayed on an electronic paper display is known for moving images. U.S. Pat. No. 9,245,485 discloses to present video images on e-book readers in a 1-bit mode. The 1-bit mode increases the velocity of displaying the images of a video so that the e-book can handle the videos. 1-bit mode shows however only black and white colours. In order to compensate the loss of quality due to the 1-bit mode, the images of the video are dithered before sending them to the e-book reader. EP2054755 discloses a dithering of the images displayed to avoid ghosting, i.e. the shadow of previous images. Thus, dithering on a server in the state of the art of electronic paper displays is principally used for black and white images or 1-bit images for showing videos on electronic paper displays.

SUMMARY OF THE INVENTION

It is the object of the invention to provide an improved system and method for displaying digital art images on digital art frames.

According to the invention, this object is solved by a method and system for presenting a digital art image according to the independent claims.

The dithering of the digital art image allows to achieve a higher quality of the digital art images notwithstanding the reduced number of intensity levels of the electronic paper display of the digital art frame. Thus, the combination of the electronic paper display and the dithering allows quality digital art image and a low energy consumption of the digital art frame. The pre-processing of the digital art images allows more complex dithering processes leading to higher quality digital art images. In addition, the transfer of the pre-processed digital art image on the digital art frame is fast and consumes only a minimum energy.

According to the invention, this object is solved by a method for presenting a digital art image comprising the steps of: processing of the digital art image to reduce the number of intensity levels of the digital art image to a reduced number of intensity levels and to obtain a processed digital art image with the reduced number of intensity; transferring the processed digital art image to a digital art frame; and displaying the processed digital art image on an electronic paper display of the digital art frame.

According to the invention, this object is solved by a system for presenting a digital art image comprising a server and a digital art frame, wherein the digital art frame comprises an electronic paper display with a number of intensity levels, wherein the server is configured to store a plurality of processed digital art images, wherein the processed digital art images have the same number of intensity levels as the electronic paper display, wherein the system is configured to transfer one of the processed digital art images to the digital art frame and to display the processed digital art image transferred on the electronic paper display of the digital art frame.

According to the invention, this object is solved by a digital art frame comprising an electronic paper display for displaying digital art images.

According to the invention, this object is solved by a software program configured to execute the following steps, when executed on a processing means: processing a digital art image to obtain a processed digital art image for displaying on a digital art frame with an electronic paper display; and/or transferring the processed digital art image to a digital art frame and displaying the transferred digital art image on the electronic paper display of the digital art frame.

The dependent claims refer to further advantageous embodiments.

In one embodiment, the digital art image(s) stored on the server are dithered by a dithering processing.

In one embodiment, a first digital art image is processed by a first dithering processing to obtain a first processed digital art image and a second digital art image is processed by a second dithering processing to obtain a second processed digital art image, wherein the first dithering processing is different from the second dithering processing, wherein the first or second processed digital art image is transferred to the digital art frame and displayed on the electronic paper display of the digital art frame. This has the advantage that for each digital art image, an optimized dithering processing can be applied to increase the quality of the processed digital art image displayed on the electronic paper display. The first and the second processed digital art images can be transferred to the same digital art frame and be displayed subsequently on the same digital art frame. In another embodiment, the first processed digital art image is transferred to the digital art frame and is displayed on the digital art frame, and the second processed digital art image is transferred to a further (distinct) digital art frame and is displayed on the further digital art frame. Thus, in the latter embodiment, the first and second processed digital art images can be displayed contemporaneously on different digital art frames.

In one embodiment, the dithering processing comprises a multi dithering processing which applies a different dithering processing in different image regions. There are many different dithering algorithms each with many different dithering parameters. Dithering increases in general the quality of the images in regions with smooth intensity transition, but most dithering algorithms decreases the quality of edges. Thus, for images with edges, dithering does not necessarily increase the quality of the digital art image. Multi dithering allows to apply different dithering processes in different regions of the image so that depending on the image content of the respective region, the best dithering processing can be applied. This might also include to apply for some regions no dithering processing. The multi dithering processing of the digital art image results in a multi dithered digital art image. The different dithering processing can be different dithering algorithms and/or different dithering parameters of the same dithering algorithm. The different dithering processing can also be an adaptive dithering algorithm whose filter kernel varies depending on the content of the region of the digital art image to be dithered.

In one embodiment, the multi dithering process comprises selecting at least a first region and a second region as different regions, applying a first dithering process to the first region and applying a second dithering process to the second region, wherein the first dithering process and the second dithering process are different. Preferably, the first dithering process and the second dithering process are different dithering algorithms. Alternatively, the first dithering process and the second dithering process are the same dithering algorithm, but with different dithering parameters.

In one embodiment, the first dithering process is an ordered dithering algorithm and/or the second dithering process is an error diffusion dithering algorithm. The combination of an ordered dithering algorithm and an error diffusion algorithm works particularly well. The ordered dithering algorithm works well on regions with edges and textures, while the error diffusion dithering algorithm works particularly well for smooth intensity transitions.

In one embodiment, the selection of the different regions and/or the selection of the different dithering processes in each of the different regions is performed by the server. This allows the automatization of the image processing without any human intervention.

In one embodiment, the multi dithering processing comprises an adaptive dithering filter.

In one embodiment, the dithering processing comprises an adaptive dithering filter.

In one embodiment, the adaptive dithering processing comprises/uses a filtering kernel depending on the position of the kernel on the digital art image and/or being different in the different regions of the digital art image. The adaptive filter automatically adapts the filtering kernel to the application area so that the step of selecting different regions with different properties can be avoided.

In one embodiment, the filtering kernel depends on the intensity differences between the pixels of the application region of the filtering kernel on the digital art image. This allows to adapt the filter kernel based on the presence of edges in the application region.

In one embodiment, the adaptive dithering processing varies the dithering processing (in different regions of the digital art image) based on the saliency and/or based on the presence of edges. This dithering processing works thus more like the human eye and reduces the dithering effect at edges and/or increases the importance of salient regions of the digital art images in the dithering processing.

In one embodiment, the dithering processing and/or the multi dithering processing is an optimization based dithering processing. The optimization based dithering processing preferably optimizes the dithering of an image based on a cost function.

In one embodiment, the digital art frame is mounted on a wall.

In one embodiment, the server is accessible by a plurality of users, wherein each user controls at least one digital art frame.

In one embodiment, each user can access the server by user credentials. The user credentials are typically username and password. However, the user credentials can also be other like an electronic certificate, a hardware credential like a smart card, an NFC chip or also a biometric credential like fingerprint, voice recognition, retinal scan or face recognition.

In one embodiment, each user can download/transfer the processed digital art image on one of the at least one digital art frame of the user to be displayed on the electronic paper display of this digital art frame.

In one embodiment, each user can access a user area on the server. The user area gives the user access to his processed digital art images and allows to manage the at least one digital art frame of the user. The management of the at least one digital art frame of the user (user management) allows to register the digital art frame, to upload digital art images of the user to his digital art frames and/or to associate locations and/or orientations of the digital art frames with the digital art frames. The user can also select one or more digital art images from a library of digital art images so that those selected one or more digital art images are available in the user space. The registration of the digital art frames in the user area identifies the details of the electronic paper display used in the digital art frame for each registered digital art frame.

In one embodiment, the system comprises an intermediate device of the user. The intermediate device of the user is preferably configured to perform the described user management. The intermediate device is preferably connected over an internet connection to the server to perform the user management. The intermediate device of the user acts preferably as a user input for controlling the server.

In one embodiment, one of the users uploads an image as the digital art image on the server, wherein one of the at least one digital art frame of the user receives the processed digital art image to display the at least one digital art image on the electronic paper display of this digital art frame.

In one embodiment, the intermediate device is configured to select on the server the processed digital art image to be displayed on the digital art frame and/or the (selected) processed digital art image is transferred via the internet connection to the digital art frame.

In one embodiment, the digital art frame comprises a first wireless communication interface for connecting to a local network, wherein the digital art frame is connected over the local network to the internet. The local network is preferably a wireless local area network (WLAN). Preferably, the digital art frame comprises a second communication interface for configuring the first wireless communication interface. The second communication interface is preferably a wireless communication interface. Preferably, the second communication interface is preferably a Bluetooth connection.

In one embodiment, the processed digital art image is sent over the intermediate device to the digital art frame.

In one embodiment, the intermediate device comprises a software which is configured to do one or more of the following first actions: to allow the user to select processed digital art images to download/transfer from the server to the digital art frame; to distribute automatically a plurality of digital art images to a plurality of digital art frames; to detect the orientation of the digital art frame on the wall. Preferably, the intermediate device is further configured to do at least one second action. The at least one second action comprises preferably the configuration of the first wireless communication interface of the digital art frame for connecting to the local network. Preferably, the intermediate device and/or its software is configured to perform one or more first actions on the server through a first communication interface and/or is configured to perform one or more second actions on the digital art frame through a second communication interface.

In one embodiment, the orientation of the digital art frame is detected and the digital art image is presented on the electronic paper display depending on the detected orientation of the digital art frame.

In one embodiment, a plurality of processed digital art images are transferred to a plurality of digital art frames, wherein the processed digital art images are distributed to the plurality of digital art frames depending on the detected orientation of the digital art frames.

In one embodiment, a user can rotate the processed digital art image on the digital art frame, wherein the orientation of the digital art frame is detected based on the selected rotation orientation of the processed digital art image on the digital art frame.

In one embodiment, a user can rotate the processed digital art image on the digital art frame, wherein the orientation of the digital art frame is detected based on a user input from the user.

In one embodiment, the orientation is detected by an orientation sensor in the digital art frame.

In one embodiment, the method/system comprises a first digital art frame with a first electronic paper display and a second digital art frame with a second electronic paper display being different than the first electronic paper display. Preferably, the processing of the digital art image comprises a first processing of a digital art image to obtain a first processed digital art image and a second processing of the (same) digital art image to obtain a second processed digital art image. Preferably, the processed digital art image comprises a first processed digital art image processed by a first processing of the digital art image and a second processed digital art image processed by a second processing of the digital art image. Preferably, the first processing and the second processing, respectively, reduces the number of intensity levels of the digital art image and comprises a dithering processing of the digital art image. Preferably, the processed first digital art image is transferred to and displayed on the first digital art frame and the processed second digital art image is transferred to and displayed on the second digital art frame. This allows to optimize the image quality of the digital art image for the details of the different electronic paper displays of different digital art frames. Preferably, the first processed digital art image is different from the second processed digital art image. Preferably, first electronic paper display and the second electronic paper display have a different size, number of pixels and/or resolution. Preferably, the first and second electronic paper display have the same number of intensity levels. Preferably, the first processing of the digital art image and the second processing of the digital art image are different. Preferably, the dithering process of the first processing of the digital art image and the dithering process of the second processing of the digital art image are different.

In one embodiment, the processing of the digital art image comprises the step of comparing the processed digital art image with the digital art image.

In one embodiment, the processing of the digital art image comprises the steps of: displaying the processed digital art image on an auxiliary electronic paper display being equal to the electronic paper display in the digital art frame; taking a photo of the processed digital art image displayed on the auxiliary electronic paper display; comparing the photo with the digital art image.

In one embodiment, the processed digital art image is further processed based on the comparison result to obtain an improved processed digital art image, wherein the improved processed digital art image is transferred as processed digital art image to the digital art frame. In one embodiment, the processed digital art image is obtained by an optimization processing based on the comparison result. The comparison result is the result of comparing the photo with the digital art image and/or the result of comparing the processed digital art image with the digital art image. The result is preferably based on a deviation of the photo or the processed digital art image from the digital art image.

In one embodiment, the server automatically performs the processing of the digital art image.

In one embodiment, the electronic paper display comprises sixteen grey intensity levels and the reduced number of intensity levels is sixteen.

In one embodiment, the digital art frame comprises mounting means to mount the digital art frame on a wall.

In one embodiment, the mounting means of the digital art frame comprises a frame part fixed to the digital art frame and a wall part fixed to the wall or to be fixed to the wall, wherein the digital art frame can be removably fixed with the frame part to the wall part in two orientations, wherein the two orientations have 90° difference between them. This allows to quickly change the orientation of the digital art frame by 90°.

In one embodiment, the wall part is preferably a hook and/or the frame part is preferably a recess or a hole in the housing of the digital art frame.

In one embodiment, the digital art frame comprises a wireless communication means configured to connect over the internet to the server.

In one embodiment, the software program is executed by the server as processing means.

In one embodiment, the software program is executed by the server and the intermediate device as processing means.

In one embodiment, the software program is executed by the system as processing means.

Other embodiments according to the present invention are mentioned in the appended claims, the subsequent description of

BRIEF DESCRIPTION OF THE SEVERAL VIEWS OF THE DRAWINGS

In the drawings, the same reference numbers have been allocated to the same or analogue element.

DESCRIPTION OF SPECIFIC EMBODIMENTS OF THE INVENTION

Other characteristics and advantages of the present invention will be derived from the non-limitative following description, and by making reference to the drawings and the examples.

Figure 1:
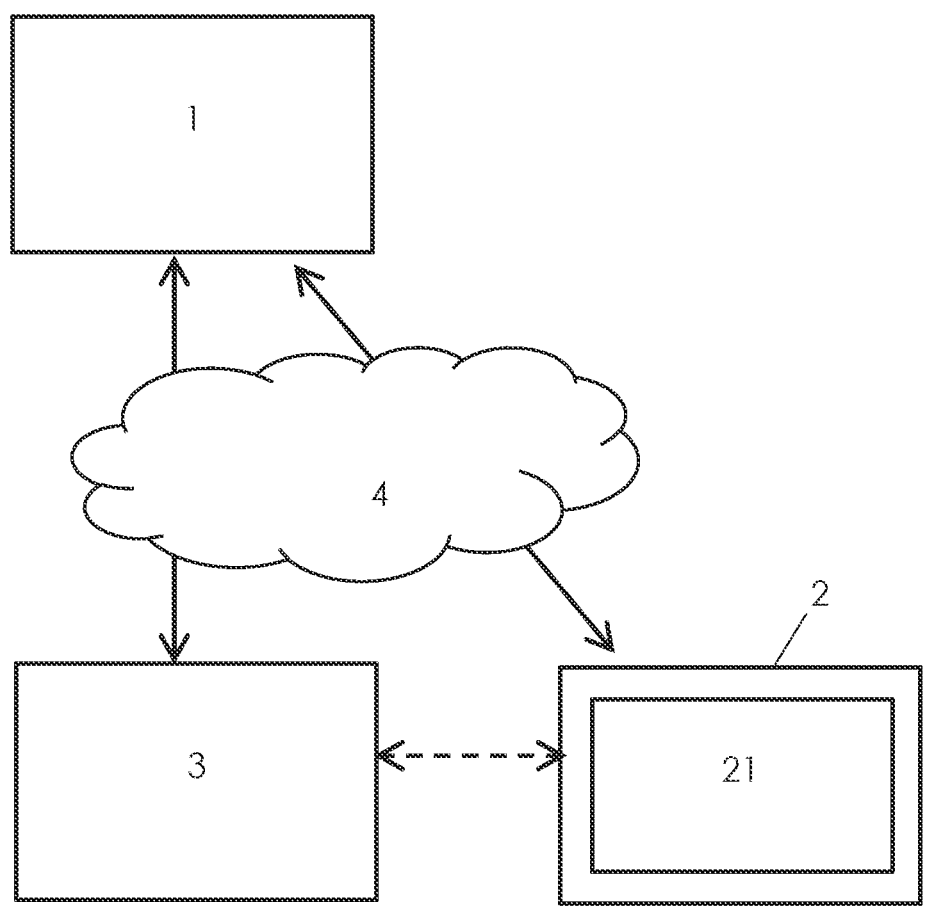
FIG. 1 shows a schematic illustration of an embodiment of the system for presenting digital art images.

FIG. 1 shows an embodiment of the system for presenting digital art images. The system comprises a server 1 and a digital art frame 2. Optionally, the system can comprise an intermediate device 3.

A digital art image is preferably a digital art image configured to be displayed on a digital display. The digital art image can be a colour image or a grey scale image. The digital art image comprises a number of intensity levels. The number of intensity levels of the digital art image is preferably 256 or higher. For a colour image, each colour (e.g. red, green and blue) has the corresponding number of intensity levels. The digital art image has image characteristics like number of pixels, size ratio, etc. The digital art image can comprise any type of images to be displayed on a display. However, preferably, the digital art image comprises art image and/or photos of users like family photos. Art images art preferably also photographic art. But other art images are also possible. Preferably, the digital art image does not contain any text. However, it would also be possible that the digital art image contains (occasionally) text.

Figure 3:
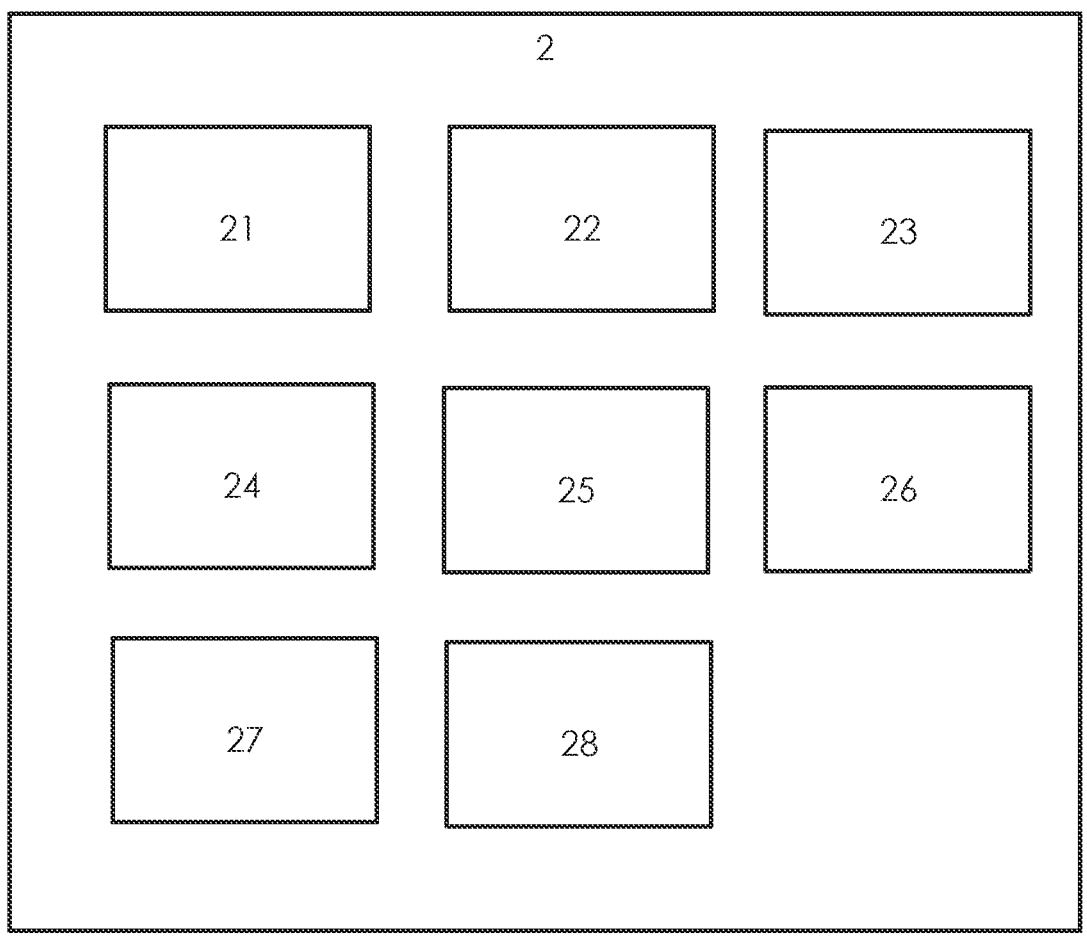
FIG. 3 shows a schematic illustration an embodiment of a digital art frame of the system for presenting digital art images.

The digital art frame 2 comprises an electronic paper display 21 (sometimes also called electronic ink display). Preferably, the digital art frame 2 comprises one or more of a mounting means 22, a first communication interface 23, a power supply means 24, an orientation sensor 25, a controller 26, a second communication interface 27 and user input means 28. FIG. 3 shows an embodiment of the digital art frame 2.

The digital art frame 2 comprises preferably a first planar side and a second planar side. The first planar side is arranged opposed to the second planar side. Preferably, the digital art frame 2 is mounted with the second planar side to the wall and is configured to shows digital art images on the first planar side. The digital art frame 2 is preferably rectangular with four lateral sides. Preferably, the four lateral sides comprise a first lateral side, a second lateral side opposed to the first lateral side, a third lateral side and a fourth lateral side. The first lateral side is preferably parallel to the second side and perpendicular to the third lateral side and the fourth lateral side. The third side is preferably parallel to the fourth lateral side and perpendicular to the first lateral side and the second lateral side. The digital art frame 2 can however have also other forms.

The electronic paper display 21 is configured to display images, in particular processed digital art images as explained later. The electronic paper display 21 refers to a display whose displayed image is visible to a user by light reflection and/or does not (actively) emit light like classic light emitting displays. Preferably, the electronic paper display is preferably an electrophoretic display. However, another electronic paper display technology can be also used. The electronic paper display 21 has preferably a number of intensity levels which can be displayed on the display 21. Preferably, the electronic paper display 21 is a grey level display, i.e. the electronic paper display 21 can show only grey levels and/or no colours. However, it might be possible to use in the future a colour electronic paper display 21 configured to display different colour levels. Preferably, the electronic paper display 21 is configured to show at least 4, preferably at least 8, preferably at least 16 different (grey) intensity levels. Preferably, the electronic paper display 21 is configured to show equal or less than 128 intensity levels, preferably equal or less than 64 intensity levels, preferably equal or less than 32 intensity levels. Preferably, the electronic paper display 21 is configured to show 16 (grey) level intensity levels and/or to display 4-bit images. The electronic paper display 21 is defined by the display characteristics like number of pixels, size and/or pixel density. The number of pixels is preferably a tuple of the number of pixels in x-direction and the number of pixels in y-direction. However, the number of pixels can also be the number of pixels in total. The size can be the diagonal of the display. The size can also be a tuple of the size in x-direction and the size in y-direction. The electronic paper display 21 is arranged so in the digital art frame 2 that it is visible to a user on the first planar side of the digital art frame 2 and/or the electronic paper display 21 is arranged on the first planar side of the digital art frame 2.

The digital art frame 2 comprises preferably the mounting means 22. The mounting means 22 is configured to fix the digital art frame 2 on the wall. The mounting means 22 is preferably arranged on the second planar side of the digital art frame 2 with the electronic paper display 21. The mounting means 22 comprises preferably a wall part and a frame part. The frame part is fixed to the digital art frame 2. Fixed can mean as well that the frame part is integrally formed by the housing of the digital art frame 2. The wall part is configured to be fixed to a wall. The mounting means 22 is configured to turn the orientation of the digital art frame 2 by 90°. The orientation of the digital art frame is a rotational state of the digital art frame 2 around the normal axis of the electronic paper display 21 such that the orientation of the electronic paper display 21 can be rotated by 90°, when rotating the digital art frame 2 by 90°. Thus, the digital art frame can be rotated to change the display orientation from landscape to portrait and vice versa. Preferably, the mounting means 22 is preferably configured that the wall part can be rotated by 90° with respect to the frame part to change the orientation of the digital art frame 2 by 900. Preferably, the digital art frame 2 and/or the frame part of the mounting means 22 can be removably fixed to the wall part. Preferably, the frame part can be fixed to the wall part in two orientation states which have 900 orientation difference to obtain the two orientation states of the digital art frame 2. Thus, in order to change the orientation of the digital art frame 2 hanging on the wall, the digital art frame 2 with the frame part is removed from the wall part, turned by 90° and fixed again to the wall part with the new orientation. In one embodiment, the mounting means 22 does not allows orientation angles between 0° and 90° of the digital art frame 2 and/or of the frame part and the wall part. The mounting means 22 with the frame part and the wall part allows an easy and stable mounting of the digital art frame 2 on the wall. Preferably, the wall part is mounted in a way that the lateral sides of the digital art frame 2 are aligned vertically and/or horizontally, when the digital art frame 2 with the frame part is fixed to the wall part. Thus, when changing the orientation of the digital art frame 2, it is not necessary to align the digital art frame 2 horizontally. The frame part and the wall part can for example interact by a form fitting. The wall part could be a male part for example a hook and the frame part could be a female part receiving the male part.

The digital art frame 2 comprises preferably the first communication interface 23 configured to communicate with the server 1 and/or to receive an image to be displayed on the electronic paper display 21. The first communication interface 23 is preferably connected over the internet 4 to the server 1. The first communication interface 23 is preferably a wireless communication interface. This allows to wirelessly receive the processed digital art image from the server 1. The wireless communication interface 23 is preferably a radio communication interface. However, it would also be possible to use light communication like infrared communication. Preferably, the wireless communication interface is (configured to be) connected to a local network. Preferably, the first communication interface 23 is connected over the local network to the internet 4 (over which it is connected to the server 1). The local network is preferably a WLAN network. However, the local network can also be an alternative network protocol like a WAN, a low-power wide-area network (LPWAN) like Long Range (LoRa) or any other local network. However, the wireless first communication interface 23 can also be (configured to be) connected to a cellular network (and over the cellular network to the internet 4 and to the server 1). The cellular network can be a cellular phone networks like GSM, 3G, 4G, 5G or other cellular IoT networks.

The digital art frame 2 comprises preferably the second communication interface 27 configured to communicate with the intermediate device 3. The second communication interface 27 is preferably a wireless communication interface 27 configured to communicate with the intermediate device 3 being in physical vicinity to the digital art frame 2. The wireless communication interface 23 is preferably one or more of the following Bluetooth (registered trademark), Wireless Local Area Network (WLAN), Near Field Communication (NFC), etc. The wireless communication interface 23 can also be a communication protocol for internet of things like a low-power wide-area network (LPWAN) like Long Range (LoRa). The digital art frame 2 is preferably configured to receive at the second communication interface 27 configuration information for configuring the first communication interface 23. The configuration information is preferably configured to configure the first communication interface to be connected with the local network and/or with the internet 4 and/or with the server 1. The digital art frame 2 is preferably further configured to configure the first communication interface 23 based on the configuration information.

In a preferred embodiment, the first communication interface 23 and the second communication interface 27 are preferably distinct and/or different. However, in another embodiment, it is also possible to use the same communication interface for the described function of the first and second communication interface 23/27. In a less preferred embodiment, it is also possible to use just the first communication interface 23 (e.g. if the configuration of the connection is not necessary or can be done at the digital interface directly, e.g. by a user input means 28). It is also possible to use just the second communication interface 27 (e.g. if the images are received over the intermediate device 3 of the user).

To save power, the wireless communication interface 23 could comprise a switch which switches the wireless communication interface 23 on only when needed. The switch can switch the first communication interface 23 from a stand-by mode into an operation mode or could switch the first communication interface 23 from a powered-off mode into an operation mode. The switch could be a switch on the digital art frame 2 which is activated by a user input on the user input means 28, e.g. a wake-up button on the digital art frame 2. The switch could also be activated by a radio signal of the wireless communication protocol of the wireless communication interface 23 itself, e.g. a signal switching the wireless communication interface 23 from the stand-by modus into the operating mode, before receiving an image to be presented on the digital art frame. The switch could also be realised by a transponder in the wireless communication interface 23 as an NFC which receives the power for the switch from the transponder signal. The switch can also be operated by a time management of the controller 26. In this case, the switch would switch the first communication interface 23 on to connect to the server 1 to see, if there are new messages waiting for the digital art frame 2. If this is the case, the digital art frame 2 would process the messages waiting for the digital art frame 2 and after this processing of the messages, switch the first communication interface 23 off again. If this is not the case, the first communication interface 23 is switched off again. Preferably, the interval between two subsequent connections to the server or between two switched-on states of the switch are larger than 1 second (sec), preferably larger than 10 sec, preferably larger than 30 sec, preferably larger than 60 sec, preferably larger than 5 minutes (min). It is also possible to apply longer intervals like larger than 10 min, larger than 30 min, larger than 60 min. The embodiments of the control of the switch can also be combined. For example, the time management of the switch can be combined with a control by the user input means 28. This allows to use long intervals between two connections to the server 1 for automatically connecting to the server 1 and (when a connection is urgently required), the connection to the server 1 can be switched on by an input via the input means 28, e.g. a wake-up button.

A similar switching can be applied equally for the second communication interface 27 as for the first communication interface without repeating the description.

The power supply 24 is configured to provide the power for operating the digital art frame 24. The power supply 24 is preferably a battery. The battery can be a rechargeable battery like a lithium ion battery. It is however also possible that the battery comprises one or more non-rechargeable and replaceable battery/batteries. Additionally or alternatively, the power supply can comprise regenerative energy sources like solar panels for re-charging the battery or for providing directly the power supply. Preferably, the power supply 24 is self-sufficient (at least for a while) and/or does not require a connection to the power grid by a cable. This facilitates the mounting of the digital art frame 2 on the wall. The digital art frame 2 might be connected with a cable to the power grid or any other power source for charging the battery of the digital art frame 2, when the battery is discharged.

The orientation sensor 25 is configured to detect the orientation of the digital art frame 2 and to communicate (via the wireless communication interface 23) the detected orientation to the intermediate device 3 and/or the server 1. The orientation sensor 25 could be for example a magnetic sensor. The orientation sensor 25 is however optional.

The digital art frame 2 comprises preferably the controller 26. The controller 26 is preferably configured to control the operation of the digital art frame 2 and all its elements. Preferably, the controller 26 controls the electronic paper display 21 and/or the wireless communication interface 23 and/or the orientation sensor 25. The digital art frame 2 and/or the controller 26 is preferably configured to receive an image, in particular a processed digital art image and to display this image received on the electronic paper display 21. Preferably, the digital art frame 2 receives via the wireless communication interface 23 an orientation together with the image to be displayed. Preferably, the digital art frame 2 and/or the controller 26 is configured to display the image received with the orientation received on the electronic paper display 21.

The digital art frame 2 comprises preferably the user input means 28. The user input means 28 is configured to receive a user input for the digital art frame 2. In the preferred embodiment, the user input means 28 is very simply, e.g. a button just to wake up the digital art frame 2 and the remaining user input is received via the first and/or second communication interface 2. However, it is also possible to receive more user input over the user input means 28. It is for example possible to receive the configuration information for the first communication interface 23 over the user input means 28 (instead of over the second communication interface 27).

Preferably, the system comprises a plurality of digital art frames 2 as described above. The plurality of digital art frames 2 and/or the system comprises a plurality of types of the digital art frames 2. The different types of digital art frames 2 have preferably different electronic paper displays 21 with different characteristics of the electronic paper displays 21 for the different types of the digital art frame 2. Preferably, the electronic paper displays 21 of the different types of the digital art frame distinguish in size and/or pixel numbers. The different types of digital art frames comprise preferably a first digital art frame 2 of a first type and a second digital art frame 2 of a second type, where the first digital art frame 2 has an electronic paper display 21 with first characteristics and the second digital art frame 2 has an electronic paper display 21 with second characteristics being different from the first characteristics. Preferably, the electronic paper display 21 of the first and second digital art frame distinguish preferably in size, pixel number and/or pixel density. The plurality of digital art frames 2 are preferably possessed by or under control of different users. Preferably, each user has at least one digital art frame 2. Some users might have a plurality of digital art frames 2. The plurality of digital art frames 2 can be associated to different groups with each group comprising at least one digital art frame 2. Each group could relate to a common location, e.g. a first group for the living room, a second group for the kitchen, a third group for the office, etc.

The server 1 is a computing arrangement configured to provide the described functions of the server 1. The server 1 can be realized by one or a plurality of computing devices. The server 1 can by a physical computing arrangement like one or more server or server arrangements. The server 1 can also be a virtual server like a cloud server as commonly provided by cloud providers hosting certain server services. The server can be distributed over different virtual and/or physical computing arrangements. The server 1 can have different sub-servers. Distinct functions of the server 1 can be handled by distinct sub-servers of the server 1 with the sub-servers being independent from each other. Different sub-servers can provide the same functions of the server 1 to provide back-up capacity or to increase the capacity.

Figure 2:
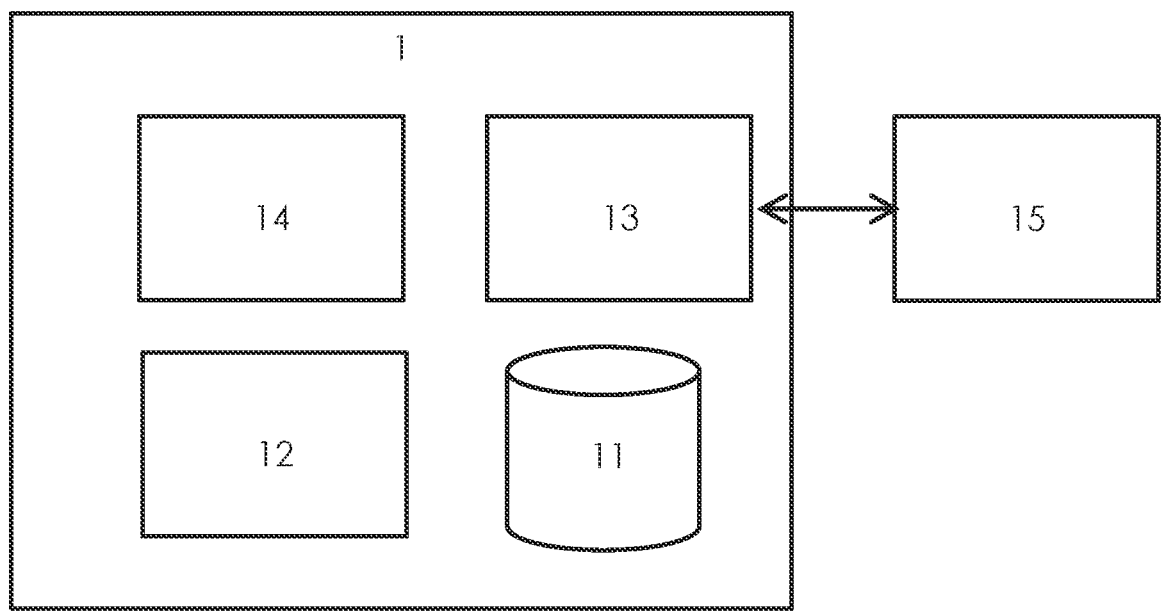
FIG. 2 shows a schematic illustration of an embodiment of a server of the system for presenting digital art images.

The server 1 is configured to provide at least one, preferably a plurality of processed digital art images. The server 1 comprises preferably a database 11 storing the plurality of processed digital art images. For simplicity, the database 11 is described as part of the server 11. This shall comprise also the possibility that the database 11 is connected via the internet or another network to the server 1. FIG. 2 shows an embodiment of the server 1. Preferably, the database 11 stores one or more versions of the or each digital art image.

The following shall describe the terminology used for digital art images. The term "digital art image" shall refer to all versions of the digital art image showing the same image, but maybe with different image characteristics like number of intensity levels, number of pixels, etc. The general use of the "digital art image" shall include all possible options or versions of the digital art image, if not clear from the context that a special digital art image is intended. A first version of the digital art image is the "received digital art image" or the "original digital art image". The received/original digital art image refers to a digital art image received for presentation on digital art frames 2. The received/original digital art image can have undergone as well as some minor pre-processing steps (but not a reduction of the number of intensity levels). A second version of the digital art image is the "processed digital art image". The processed digital art image is received by image processing of the received/original digital art image and/or is optimized for the electronic paper display 21 of the digital art frame 2. In particular, the processed digital art image has a reduced number of intensity levels compared to the received/original digital art image and/or has undergone a dithering processing. Sometimes, there are different versions of the processed digital art image as already described above. Another version of the digital art image might be the selection digital art image. The selection digital art image is the version of the digital art image displayed on the intermediate device 3, when selecting a digital art image for displaying on the digital art frame 2. The selection digital art image can be the original/received digital art, the processed digital art image or also a further distinct version of the digital art image different from the received and processed digital art image. The database 11 stores preferably different versions of the digital art image. The database 11 stores always the processed digital art image. In addition, the database 11 stores preferably further versions of the processed digital art image optimized for different digital art frames 2. In addition, the database 11 stores preferably the original/received digital art image. In addition, the database 11 stores preferably the selection digital art image (if different from the other digital art images already stored in the database). The database 11 can comprise different sub-databases storing each different versions of the digital art image.

In one embodiment, the server 1/database 11 stores for different types of digital art frames 2 with different characteristics of the electronic paper display 21 a different processed digital art image optimized for the respective characteristics of the electronic paper display 21. The different processed digital art images for the different types of digital art frames 2 refer to the same (original) digital art image and/or show the same digital art image, but are processed differently to optimize the processed digital art image for each type of digital art frame. Thus, a first processed digital art image and a second processed digital art image show both approximately the same content of the same digital art image. The first processed digital art image is processed differently than the second processed digital art image. The first processed digital art image is processed to be optimized for the characteristics of the electronic paper display 21 of the first digital art frame and the second processed digital art image is processed to be optimized for the characteristics of the electronic paper display 21 of the second digital art frame 2. This allows a high-quality optimisation of the digital art image, but fast response times for downloading/transferring the processed digital art image on the respective digital art frame 2.

The server 1 comprises preferably a communication interface 12. The communication interface 12 is configured to transfer a processed digital art image from the server 1/database 11 to the digital art frame 1. Preferably, the communication interface 12 is connected to the internet 4. Preferably, the server 1 is connected over the communication interface 12 (over the internet 4) to the intermediate device 3 and/or to the digital art frame 2. The communication interface 12 is preferably further configured to receive a digital art image for providing the processed digital art image.

The server 1 comprises preferably an image processing means 13 configured to process a digital art image received to obtain the processed digital art image. The processing for obtaining the processed digital art image will be described in more detail below. In one embodiment, the digital art image is processed with a first processing for obtaining the first processed digital art image for the first digital art frame and the digital art image is processed with a second processing for obtaining the second processed digital art image for the second digital art frame. The first and second processing are preferably different. The first and second processed digital art image are preferably different (even if they show the same content of the digital art image). The subsequent description of the processing of the digital art image will equally hold for the first and second processing which preferably distinguish only in one or more parameters.

In one embodiment, the image processing means 13 is configured to obtain the processed digital art image fully automatically from the digital art image. In another embodiment, the image processing means 13 is configured to semi-automatically obtain the processed digital art image from the digital art image. This embodiment can involve a human intervention to obtain the processed digital art image. The human intervention could be limited to some digital art images for which an automated quality check of the image processing means 13 results in an insufficient quality. The human intervention could also be for each digital art image, e.g. for selecting in which regions of the digital art image which image processing technique is applied.

The server 1 comprises preferably a controller 14. The controller 14 is preferably one or more Central Processing Units (CPUs) running a program for controlling the server 1.

In one embodiment, the server 1 comprises a quality check arrangement 15. Strictly speaking is the quality check arrangement 15 connected with the computing arrangement of the server 1. For simplicity, the quality check arrangement 15 is described as being part of the server 1. The quality check arrangement 15 comprises preferably an auxiliary electronic paper display and a digital photo camera. The auxiliary electronic paper display has preferably the same display characteristics as the auxiliary paper display 21 of the digital art frame 2. The auxiliary electronic paper display could be realised by a digital art frame 2 being equal to the digital art frame of the users. The digital photo camera is arranged such to capture a photo of the auxiliary electronic paper display. The quality check arrangement 15 receives the processed digital art image, displays the processed digital art image on the auxiliary electronic paper display and takes a photo of the processed digital art image displayed on the auxiliary electronic paper display. This photo can be used for determining a quality of the processed digital art image by comparing the (original) digital art image with the photo. The comparison result can be used for determining the quality of the processed digital art image and/or as a feedback for image processing algorithms, e.g. for optimization-based image processing algorithms or iterative image processing algorithms.

Figure 4:
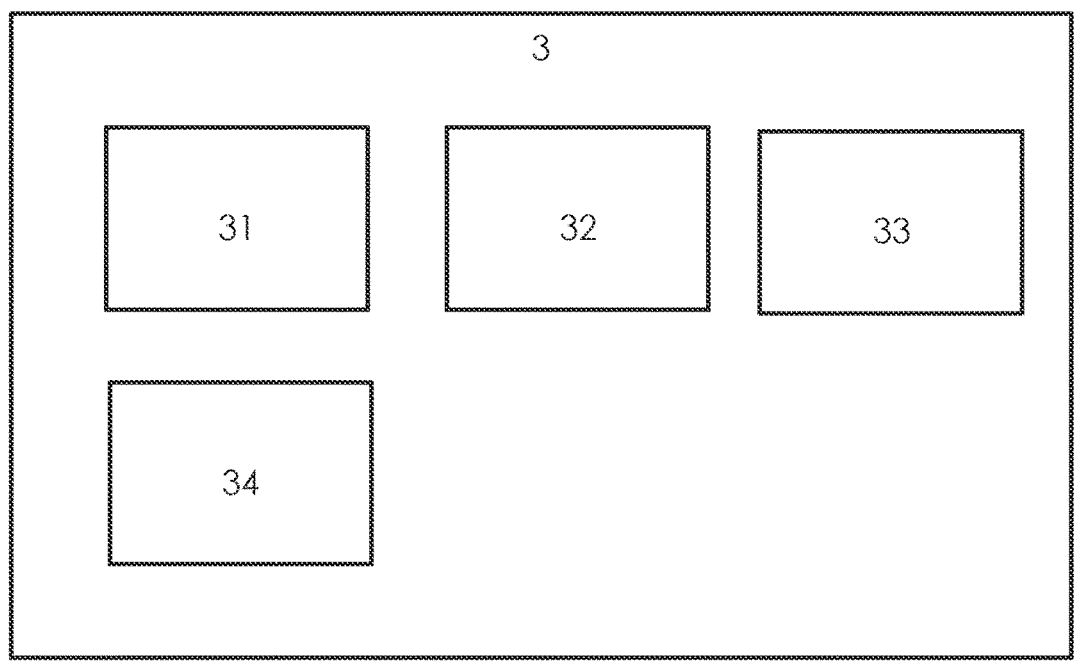
FIG. 4 shows a schematic illustration of an embodiment of an intermediate device of the system for presenting digital art images.

The intermediate device 3 is preferably configured to access the digital art image(s) of the server 1 and/or to transfer the digital art image(s) from the server 1 to the digital art frame 2. The intermediate device 3 comprises preferably a first communication interface 31, a second communication interface 32, a controller 33 and/or a user interface 34. FIG. 4 shows an embodiment of the intermediate device 3. The intermediate device 3 is preferably a general computing device such as a computer, a smartphone, a tablet or a portable computer. The intermediate device 3 can be realized also by different of those devices together. E.g. the same client application software can run on the tablet, the smartphone and the computer of the user and the user can decide which intermediate device 3 he chooses for any function the user likes.

The first communication interface 31 is configured to communicate with (the communication interface 12 of) the server 1. The first communication interface 31 is preferably a communication interface 31 to establish a connection to the internet 4 like a WLAN, a cellular phone interface, or others.

The second communication interface 32 is configured to communicate with (the wireless communication interface 23 of) the digital art frame 2. The second communication interface 32 is preferably a wireless communication interface like WLAN, Bluetooth. However, the second communication interface 32 can also be a wired communication interface, e.g. a LAN interface which is connected over a router with a WLAN to which the digital art frame 2 is connected. Preferably, the second communication interface 32 follows the same communication protocol as the wireless communication interface 23 of the digital art frame 2.

The controller 33 is configured to control the intermediate device 3. Preferably, the intermediate device 3 and/or the controller 33 is/are configured to access the server 1 for selecting the processed digital art images to be transferred to the digital art frame 2 and/or to perform other functions of the system. The controller 33 is preferably a general computing means like a CPU. Preferably, the functions of the system in the intermediate device 3 are realized by a software program running on the CPU of the intermediate device 3. The software program could be a browser interacting with a server program running on (the controller 14 of) the server 1. The software could also be a dedicated software application for the present system. The dedicated software application could be also a front end of the server program running server 1 (client software) or could be an independent software application (desktop software).

The user interface 34 comprises preferably a visual output means, preferably a display. The user interface 34 comprises preferably an input means like a mouse, a keyboard, a touch screen or any other.

The system comprises preferably a plurality of users. A standard user comprises at least one digital art frame 2 and preferably an intermediate device 3. The users are preferably registered to the system. Each user can preferably access the system by user credentials like a combination of username and password. The operations a user can carry out with a system software are the same for all the users and are explained exemplary only once for one user. There might be some minor changes between the functions of different users. E.g. some users might have only a reduced number of digital art images compared to others, e.g. users below a certain age. There might be some special users which do not have a digital art frame but upload only digital art images for processing the digital art image to be offered to other users as processed digital art images to be presented on the digital art frames 2 of other users. For those users, only the subsequent functions related to the uploading of digital art images are relevant.

The system comprises preferably a system software program. The system software program runs preferably on (the controller 14 of) the server 1 with front ends provided by a browser or a client software application on the intermediate device 3. However, some functions of the system software related to actions of users could also be realised in a user software running on the intermediate device 3.

The system software allows preferably a user of the system one or more of the following functions:
- to select a processed digital art image to be displayed on a digital art frame 2 of the user;
- to transfer the processed digital art image from the server 1 to the intermediate device 3 and/or to the digital art frame 2;
- to register the digital art frames 2 of the user in a user space of the user;
- to distribute different processed digital art images on different digital art frames 2 of the user;
- to upload a digital art image for image processing to the server 1 to obtain a processed digital art image (which can than be selected and/or transferred to the digital art frame 2 for displaying);
- to detect the orientation of the digital art frame 2 on the wall.

Preferably, the system (software) is configured that the user can access the database 11 with the digital art images. The user can access the database 11 preferably through the intermediate device 3. The user can preferably go through the list of digital art images and select one or more digital art images to be presented on one or more of his/her at least one digital art frame 2. The user can also select a group of digital art images, maybe collected under a common theme or keyword. For selecting the digital art images, they are preferably displayed on the intermediate device 3. Preferably, the selection digital art image is displayed to the user. Thus, the user can see the digital art image on the visual output means of the intermediate device 3. The user can select the digital art image(s) to be displayed on the at least one digital art frame 2 of the user manually or semi-automatically or automatically. In a manual selection, the user selects for one of his/her at least one digital art frame 2 a digital art image from the database 11. In a semi-manual selection, the user selects some criteria like theme, keywords, popularity, and the system (software) selects the best images falling under the selected criteria. The selected criteria could also be one criterium. In a fully automatic selection, the system (software) selects freely for the user. The system (software) might use profile information of the user like interests, demographic data, a history of selected images, etc. for the automatic selection of images. The user selection (for the manual or semi-automatic selection) can be performed at the time of the change of a digital art image on the digital art frame or could be stored for future changes of the digital art frame. The time of changing a digital art image on a digital art frame 2 could also be automatically determined, e.g. by previous user selection or by a periodic change like each week, each month, etc. Independent of how and when a digital art image is selected, it will be referred as the selected digital art image. The selected digital art image shall not indicate a special version of the digital art image, but the digital art image itself, i.e. the content of the digital art image independent of what version of the digital art image was used to select the digital art image.

The system (software) is preferably configured to transfer the processed digital art image from the server 1 to the digital art frame 2. Preferably, the processed digital art image of the selected digital art image is transferred to the digital art frame 2. If there are more than one version of the processed digital art image, the version of the processed digital art image which is optimized for the digital art frame 2 of the user is transferred to this digital art frame 2. In a preferred embodiment, the processed digital art image is transferred directly from the server 1 to the digital art frame 2 (without passing the intermediate device 2). This is preferably realized via the internet connection 4 and the local network over which the digital art frame 2 is connected to the internet 4. In a less preferred embodiment, to transfer the processed digital art image from the server 1 to the digital art frame 2 means that the processed digital art image is transferred/downloaded from the server 1 to the digital art frame 2 of the user via the intermediate device 3 of the user. The communication connection between the digital art frame 2 and the server 1 could be initiated by a user input on the user input means 28 of the digital art frame 2 to switch on the wireless communication interface 23.

The system (software) is preferably configured to register the at least one digital art frame 2 of the user in a user space of the user. Preferably, the user space registers with each one of the at least one digital art frame 2 the type of the digital art frame. This allows to transfer the processed digital art image optimized for each digital art frame 2 to the respective digital art frame 2 as the system (software) knows of which type the respective digital art frame 2 on which the selected/processed digital art image shall be presented is made off. Preferably, the at least one digital art frame comprises a plurality of digital art frames. Preferably, the plurality of digital art frames is associates to different groups. A first group comprises preferably at least one first digital art frame 2 of the plurality of digital art frames 2 of the user and a second group comprises at least one second digital art frame 2 of the plurality of digital art frames 2 of the user. The groups can be associated for example to different locations where they are mounted on the wall. This could help for a semi-automatic or automatic selection to allow the system (software) to select for each group of digital art frames 2 a similar selection criterium.

The system (software) is preferably configured to distribute different processed digital art images on different digital art frames 2 of the user. The different processed digital art images are selected by a manual, semi-automatic or automatic selection. Preferably, the system (software) is configured to distribute the selected digital art images on different digital art frames 2 of the user based on the orientation of the digital art frames 2 and of the digital art images. Preferably, the system (software) is configured to distribute the selected digital art images on different digital art frames 2 of the user based on the groups of the digital art frames 2.

The system (software) is preferably configured to upload a digital art image for image processing to the server 1 to obtain a processed digital art image. The uploaded digital art image thus corresponds to the original/received digital art image (maybe with some minor pre-processing). The uploaded digital art image is processed to obtain a processed digital art image. The user uploading the digital art image can decide, if the uploaded digital art image is for private use or also for other users (public use or semi-public use). In case of private use, the processed digital art image of the uploaded digital art image is available only for the uploading user to transfer to and/or to present on his/her at least one digital art frame 2. In case of public use, the processed digital art image of the uploaded digital art image is available to all users of the system. In case of semi-public use, the processed digital art image of the uploaded digital art image can be made available to sub-groups of the users of the system, e.g. one or more specially selected users or a standard sub-group of users. The uploading user (or in case of public or semi-public use also another user) can then select the processed digital art image of the uploaded digital art image, transfer it to his/her digital art frame 2 and display it on the digital art frame 2.

Preferably, the system (software) is configured to detect the orientation of the digital art frame 2 on the wall. In one embodiment, the orientation of the digital art frame 2 is detected based on an orientation sensor in the digital art frame 2. In one embodiment, the orientation of the digital art frame 2 is detected based on a user input. The user input for detecting the orientation could be provided by the intermediate device 3 and/or by the digital art frame 2. The user input is preferably a selection of the orientation of the digital art frame 2 or a change of the orientation of a digital art image in the digital art frame 2. The detected orientation of the digital art frame 2 is preferably registered together with each digital art frame 2 so that the system knows that digital art images with a first orientation should be distributed (rather) to digital art frames 2 of a first orientation and that digital art images with a second orientation should be distributed (rather) to digital art frames 2 of a second orientation.

The above described functions and elements of the system apply equally for the method and might not all be described again for the method for the sake of brevity.

Figure 5:
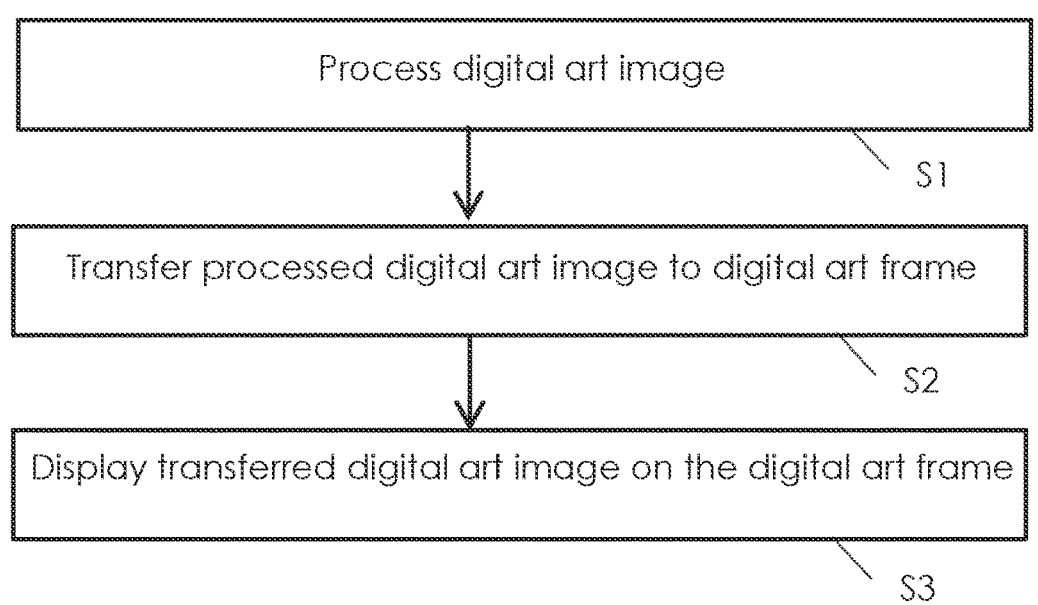
FIG. 5 shows a flow chart illustrating an embodiment of the method for presenting digital art images.

An embodiment of the method of the invention is shown in FIG. 5.

The method comprises the step S1 of processing a digital art image. Preferably, a received/original digital art image is (image) processed to obtain a processed digital art image. The image processing comprises the reduction of the number of intensity levels (of the pixels) so that the number of intensity levels of the processed digital art image is reduced compared to the number of intensity levels of the original digital art image. The original digital art image comprises an original number of intensity levels and the processed digital art image has a processed number of intensity levels. The processed number of intensity levels is preferably equal to the number of intensity levels of the electronic paper display 21 of the digital art frame 2. Preferably, the processed number of intensity levels is at least 4, preferably at least 8, preferably at least 16. Preferably, the processed number of intensity levels is equal or less than 128 intensity levels, preferably equal or less than 64 intensity levels, preferably equal or less than 32 intensity levels. Preferably, the processed number of intensity levels is equal to 16. The process of reducing the number of intensity levels is subsequently referred to as intensity level reduction processing.

The image processing and/or the intensity level reduction processing comprises preferably a dithering processing. A dithering processing attempts to approximate an intensity level of a pixel of the original digital art image in the dithered image or the processed digital art image by a mixture of other intensity levels. The other intensity levels are selected from the processed number of intensity levels. Formulated differently, the dithering process determines the intensity value of a pixel (in question) in the processed digital art image based on (the intensity level of) the corresponding pixel (in question) in the original digital art image and based on (the intensity level of) at least one further pixel of the original and/or processed digital art image in the vicinity of the pixel (in question). The pixel in question shall define any pixel of an image with a well-defined position in the image which is currently described. The pixel in question of the original digital art image has the same position as the pixel in question of the processed digital art image. The same position refers to the relative position in the image. If the original image and the processed image have the same pixel size, the absolute pixel position (and the relative position) would then be the same. If they have different pixel sizes, the same position will refer not to the absolute pixel position, but rather to the relative position. Dithering according to the invention shall not include algorithms which select the intensity level of a pixel in the processed digital art image only based on the respective intensity level of the respective pixel in the original digital art image and/or which does not consider also neighbouring pixels of the original digital art image. The pixel in question plus the at least one further pixel in the vicinity of the pixel in question is referred subsequently as the neighbourhood of the pixel in question. The neighbourhood is normally defined by the dithering algorithm and/or the dither parameters used. The dithering processing can include the intensity level reduction processing in a combined processing. It is however also possible that the image processing comprises to separate or independent processes for the intensity level reduction processing and the dithering processing. The dithering processing can be applied directly on the original digital art image or on a pre-processed form of the original digital art image. For example, the pre-processing could comprise a change of the pixel number and/or size of the digital art image and/or other pre-processing steps. The formulation "the dithering processing of the (original) digital art image" shall not exclude that other pre-processing steps have been performed on the (original) digital art image before the dithering processing is applied on the pre-processed (original) digital art image.

There are hundreds of dithering algorithms and each dithering algorithm has its advantages and disadvantages. One dithering algorithm might be more suitable for one digital art image, while another dithering algorithm might be more suitable for another digital art image. Therefore in one embodiment, a first digital art image is processed to a first processed digital art image by a first dithering processing and a second digital art image is processed to a second processed digital art image by a second dithering processing being different than the first dithering processing. Two different dithering processings means that the application of the two different dithering processings on the same image would lead to two different processed images. Two different dithering processings can distinguish in a different dithering algorithm and/or in a different dithering parameter. As will be described below, a different dithering processing could also be a different regional application of the dithering algorithm and/or parameter. For example, the same dithering algorithm with the same dithering parameter which is applied in the two images in different regions of these images leads to two different dithering processings. The selection of the correct dithering processing for each digital art image is preferably made based on the content of the digital art image, preferably the original digital art image. The use of different dithering processings to different digital art images increases the quality of the processed digital art image.

In a preferred embodiment, the dithering processing of the (original) digital art image comprises a multi dithering processing of the (original) digital art image to obtain the processed digital. The multi dithering processing of the digital art image applies a different dithering processing in different regions of the digital art image to obtain the processed digital art image.

In one embodiment, the multi dithering processing comprises the step of selecting the different regions, selecting for each of the selected different regions a dithering process and applying for each different region selected the dithering processing selected for this region of the digital art image. This allows to select for each region of the digital art image the best dithering processing and significantly increase the result of the dithering processing.

The selection of the different regions of the digital art image is made based on the content of the digital art image. The different regions have different locations in the digital art image and/or are preferably not overlapping among each other. The different regions preferably distinguish in size and/or form. Each region is selected based on at least one common image feature like presence of edges, smoothness, variation of intensities, etc. There might be some digital art images for which the selection results in only one region covering the whole digital art image, because the digital art image has the same image feature not requiring different dithering processings in different regions. Thus, different regions could also include the case of having only one region covering the whole digital art image but including an active selection process deciding between one single region and two or more different regions. The selection of the different regions of the digital art image can be performed automatically, semi-automatically or manually. Preferably, the server 1 analyses the digital art image and selects the different regions of the digital art image based on the previous analysis (fully automatically). It is however also possible that the selection of the different regions is performed by human intervention via an image processing software (manually). A combination of both (semi-automatically) is also possible. For example, the server 1 could propose already automatically a selection of the different regions which can be amended by a human intervention (if necessary).

The selection of the dithering processing for each of the selected different regions is made based on the content of the respective region. In one embodiment, in a first region an ordered dithering processing is used and in a second region an error-diffusion dithering processing is used. Ordered dithering processing replaces a pixel or a pixel group with a pixel pattern. The pixel pattern depends on the intensity level of the pixel or pixel group which is replaced. Different intensity levels are related to different patterns allowing to approximate the respective intensity level. The same intensity level is always replaced by the same pixel pattern. Ordered dithering processing proved for the above-described number of intensity levels of the processed digital art image very powerful for images or regions with structures and edges. Examples for ordered dithering algorithms are halftone dithering, Bayer dithering. Error-diffusion dithering processing diffuses the quantization error (caused by the quantization due to the reduced number of intensity levels of the processed digital art image) to neighbouring pixels. Examples of error-diffusion dithering algorithms are Floyd-Steinberg dithering, minimized average error dithering, Stucki dithering, Burkes dithering. Error-diffusion algorithms proved for the above-described number of intensity levels of the processed digital art image very powerful for images or regions with smooth intensity changes. Preferably, in a region with many edges and structures an ordered dithering algorithm is used and in a region with smooth intensity changes a diffusion-error algorithm is used. For one of the regions, the selected dithering processing could also be not to use a dithering algorithm, e.g. for continuous surface of an intensity level which can be presented by the electronic paper display. However, in this case at least one other region has to apply a dithering process and there must be an active selection between having in this region no dithering processing instead of a dithering processing. Preferably, the server 1 analyses each region of the digital art image and selects the respective dithering processing for this region of the digital art image based on the previous analysis (fully automatically). It is however also possible that the selection of the dithering processing for the respective region is performed by human intervention via an image processing software (manually). A combination of both (semi-automatically) is also possible. For example, the server 1 could propose already automatically a selection of the dithering processing for the respective region which can be amended by a human intervention (if necessary).

The steps of selecting the regions and the dithering processings for these regions can also be combined. For example, the server 1 could run different dithering processings on the digital art image and compare the resulting different dithered digital art images with the original digital art image. The comparison result can be for example an absolute difference image between the two images or a squared difference image. Based on the different comparison results for the different dithering processings, the server 1 could select the regions and their dithering processings. For example, in a first region, a first dithering processing resulted in the best result, thus a comparison result would have in this region the best result, and a second dithering processing results in best in a second region. Thus, the server 1 would select the first dithering processing for the first region and the second dithering processing for the second region.

Then, the selected different dithering processings are applied in the selected different regions of the digital application. For each selected region of the digital art image, the dithering processing selected for this region is applied. If the selection process of the region and/or the dithering processing involved the application of one or more of the selected dithering processings in the selected regions, the result of this application can be used for this step. So, the application step can in some examples be performed before having selected the regions and/or the dithering processings. The application step is preferably performed by the server 1.

In one embodiment, the multi dithering processing or the dithering processing comprises an adaptive dithering (filter) processing. The adaptive dithering (filter) processing has preferably a filtering kernel which adapts to the application area of the filter kernel. The adaptive dithering processing changes the way of filtering/dithering based on the application area of the filter. That means that the filter kernel of the dithering (filter) processing or the dithering processing is different in different regions of the digital art image and applies therefore different dithering processing in different regions of the digital art image. The filtering kernel or the dithering processing can depend on the presence of edges in the digital art image and/or on the saliency of the pixels. The presence of edges can be detected by the intensity difference between pixels in the neighbourhood of a pixel. For example, the filtering kernel of each neighbourhood can depend on the intensity differences between the pixels of the neighbourhood in the (original) digital art image and the pixel in question in the (original) digital art image. Thus, it is for example possible to move the quantization error of a pixel in question rather to the pixels in the neighbourhood having a small intensity difference (thus a similar intensity level) than to pixels with a high intensity difference (thus a more different intensity level). Such an adaptive filter kernel could be integrated in a classic error-diffusion algorithm. Below an example of such an adaptive dithering processing is explained in more detail.

Ordered dithering algorithms and error-diffusion algorithms were explained above. There are many more dithering algorithms. Most dithering algorithms require just one run over the digital art image for obtaining the processed digital art image. For example, all pixels or pixel groups of the digital art image are replaced by a certain pixel pattern depending on the intensity value of the replaced pixel or pixel group (ordered dithering algorithm). In another example, the quantization error of each pixel is diffused to the neighbouring pixels not yet being processed by the dithering algorithm (error-diffusion algorithms). However, there are also more advanced dithering algorithms or filters which try to optimize the global dithering problem by optimizing the processed digital art image based on a cost function. An example of such a cost function is $$E = \sum_{1 \leq i \leq N} \left\| \sum_{j \in N_i} w_{ij}(c_j^P - c_j) \right\|^2 \quad (1)$$

Wherein i denotes an index running over all N pixels of the digital art image. The index j runs over all pixels in the strict neighbourhood $N_i$. The strict neighbourhood $N_i$ of the pixel i in question does not include the pixel i in question itself. The strict neighbourhood $N_i$ can be defined in many ways, e.g. as the four, eight, twelve or sixteen closest pixels of the pixel i in question. Other definitions are obviously possible. $c_j^P$ indicates the intensity level of the pixel j of the processed digital art image being selected from the processed number of intensity levels. $c_j$ indicates the intensity level of the pixel j of the original digital art image. The weight $w_{ij}$ (or filter kernel) is defined by a Gaussian filter/distribution as $$w_{ij} = w_{ij}^g / \sum_{j \in N_i} w_{ij}^g, \quad (2)$$

$$w_{ij}^g = \exp(-\|x_i - x_j\|^2 / \sigma_s^2),$$

with $\sigma_s$ being the standard deviation of the Gaussian distribution and $x_i$ the spatial location of the pixel i.

The N pixels $c_j^P$ shall be retrieved by the optimization problem by reducing the cost function E. There are many optimization algorithms which could optimize this problem. Such dithering processings optimizing the dithering problem globally shall be called optimization based dithering processing.

In a preferred embodiment, the dithering processing is a multi dithering processing and an optimization based dithering processing or is an optimization-based adaptive dithering processing. Such an optimization-based adaptive dithering processing comprises a cost function whose weight or filter kernel for "mixing" the neighbouring pixels depends on the content of the pixels in this neighbourhood. The weight or filter kernel of the cost function can depend on the presence of edges and/or the saliency of the pixels in the neighbourhood of the (original) digital art image. In the following, some examples of optimization-based adaptive dithering processings are shown.

In one embodiment of an edge-sensitive processing, the cost function depends on the edges and/or depending on the intensity level differences in each neighbourhood. This can be realized by redefining the weight in the cost function E of equation (1) by the following weight $$w_{ij}' = w_{ij}^b / \sum_{j \in N_i} w_{ij}^b, \quad (3)$$

$$w_{ij}^b = \exp(-\|x_i - x_j\|^2 / \sigma_s^2) \exp(-\|c_i - c_j\|^2 / \sigma_r^2),$$

which replaces $w_{ij}$ in equation (1). $\sigma_r$ defines the standard deviation of the Gaussian distribution of the intensity difference, i.e. defines how strong certain intensity differences shall be considered in the weight. This weight functions reduces the importance of pixels beyond an edge or with a higher intensity difference for the pixel in question in the cost function so that the optimization problem considers only pixels on the right side of the edge.

In one embodiment of a saliency and edge dependent cost function, the cost function is $$E = \sum_{1 \leq i \leq N} t_i \left\| \sum_{j \in N_i} w_{ij}'(c_j^P - c_j) \right\|^2, \quad (4)$$

With the importance value $t_i$ depending on the saliency. An example equation for the importance value $t_i$ is $$t_i = \lambda + (1-\lambda)s_i;$$

with $s_i$ being the saliency of a pixel determined based on well known saliency models. An example for such a saliency model can be found in M.-M. Cheng, J. Warrell, W.-Y. Lin, S. Zheng, V. Vineet, and N. Crook, "Efficient salient region detection with soft image abstraction," published in Proceedings of IEEE ICCV. IEEE, 2013, pp. 1529-1536 which is hereby incorporated by reference for the purpose of the calculation of the saliency $s_i$. The saliency determines the importance of a pixel for the perception of a human. E.g. certain pixels or regions (salient pixels/regions) of an image might have a higher importance for a human perception than others. Those salient pixels/regions are given a higher importance in the optimization so that the optimization error is moved rather in the less important areas of the processed digital art image. The parameter $\lambda$ is non-zero and shall avoid that $t_i$ becomes zero. Here $\lambda$ is chosen 0.1. However, $s_i$ could also be used as $t_i$.

In one embodiment of a saliency depended cost function, the cost function defined in (4) could be used also in combination with other weight functions, e.g. the one defined in equation (2).

Such adaptive dithering processings like saliency and/or edge dependent dithering processings are further examples for multi dithering processings as explained above.

The image processing of the digital art image to obtain the processed digital art image might include a quality check to determine if the processed digital art image corresponds sufficiently to the (original) digital art image. In a preferred embodiment, this quality check can involve taking a photo of the processed digital art image on an auxiliary electronic paper display having the same characteristics as the electronic paper display 21. Since the error of the photo is similar than the error made by a human eye, the comparison of the photo taken from the auxiliary electronic paper display displaying the processed digital art image with the (original) digital art image provides a very good quality check for the processed digital art image. Based on this quality check, the server 1 can decide, if further improvement of the processed digital art image is necessary. For example, a semi-automatic image processing could automatically perform image processing to obtain the processed digital art image. If the quality of the processed digital art image results good enough, the processed digital art image can be added to the database 11 or transferred to a digital art frame 2 of a user. If the quality of the processed digital art image results not good enough, a human image processing can be required (semi-automatic) or a further image processing iteration could be performed (automatic). The quality check arrangement 15 could comprise for each type of the digital art frame 2 or for each type of electronic paper display 21 used in the different types of digital art frames 2 a different auxiliary electronic paper display. Each auxiliary electronic paper display of the quality check arrangement 15 has preferably the same display characteristics as the different types of electronic paper displays 21. Thus, each auxiliary electronic paper display is preferably different from each other. As explained above, for each type of electronic paper display a different processed digital art image is created. The different processed digital art images are preferably displayed on the different auxiliary electronic paper displays having the display characteristics for which the processed digital art images have been optimized. The camera is configured to capture the different auxiliary electronic paper displays. This can be realised by a plurality of cameras, each capturing a different auxiliary electronic paper display or by a movable camera. This allows to check the quality of the processed digital art image for each type of digital art frame 2.

The step of processing the digital art image is preferably performed on the server 1 (partly or fully). However, it is also possible to do the processing of the digital art image by human image processing on a computer assisted image processing program and to upload the processed digital art image on the server 1/database 11.

The method comprises the step S2 of transferring the processed digital art image to the digital art frame 2. As explained in more detail above, the processed digital art image is preferably transferred directly to the digital art frame 2.

The method comprises the step S3 of displaying the transferred (processed) digital art image on the digital art frame 2.

The invention was explained for grey levels only. However, the invention can equally be applied for electronic paper displays 21 also displaying colours. In this case, the described processing could be performed for each colour space individually or also in a common 3-dimensional colour space.

It should be understood that the present invention is not limited to the described embodiments and that variations can be applied without going outside of the scope of the claims.

The invention claimed is:

1. A method for presenting a digital art image comprising the steps of:
   processing of the digital art image to reduce the number of intensity levels of the digital art image to a processed number of intensity levels and to obtain a processed digital art image with the processed number of intensity levels, wherein the processed number of intensity levels is at least four, wherein the processing of the digital art image to obtain the processed digital art image comprises a dithering processing;
   transferring the processed digital art image to a digital art frame, wherein the digital art frame comprises mounting means to mount the digital art frame on a wall;
   displaying the processed digital art image on an electronic paper display of the digital art frame;
   wherein the processed digital art image displayed on the electronic paper display is a still image.

2. The method according to claim 1, wherein a first digital art image is processed by a first dithering processing to obtain a first processed digital art image and a second digital art image is processed by a second dithering processing to obtain a second processed digital art image, wherein the first dithering processing is different from the second dithering processing, wherein the first or second processed digital art image is transferred to the digital art frame and displayed on the electronic paper display of the digital art frame.

3. The method according to claim 1, wherein the dithering processing of the digital art image comprises a multi dithering processing of the digital art image, wherein the multi dithering processing of the digital art image applies a different dithering processing in different regions of the digital art image.

4. The method according to claim 3, wherein the multi dithering process comprises selecting at least a first region and a second region as different regions, applying a first dithering process to the first region and applying a second dithering process to the second region, wherein the first dithering process and the second dithering process are different.

5. The method according to claim 4, wherein the first dithering process and the second dithering process are different dithering algorithms.

6. The method according to claim 5, wherein the first dithering process is an ordered dithering algorithm and the second dithering process is an error diffusion dithering algorithm.

7. The method according to claim 4, wherein the selection of the different regions and/or the selection of the different dithering processes in each of the different regions is decided by a server.

8. The method according to claim 3, wherein the multi dithering processing comprises an adaptive dithering filter with a filtering kernel being different in the different regions of the digital art image.

9. The method according to claim 8, wherein the filtering kernel depends on an application region of the filtering kernel, wherein the filtering kernel depends on the intensity differences between the pixels of the application region of the filtering kernel in the digital art image.

10. The method according to claim 1, wherein a server is accessible by a plurality of users, wherein each user can access a user area on the server, wherein the digital art frame belonging to user of the plurality of users is registered in the user space of the user.

11. The method according to claim 10, wherein a user uploads an image as the digital art image on the server, wherein the uploaded digital art image is processed by the image processing to obtain the processed digital art image, wherein the digital art frame to which the processed digital art image is transferred belongs to the user.

12. The method according to claim 1, wherein the digital art frame to which the processed digital art image is transferred belongs to the user, wherein the digital art frame is connected over an internet connection (4) to the server, wherein an intermediate device of the user is connected over an internet connection to the server, wherein the intermediate device is configured to select on the server the processed digital art image to be displayed on the digital art frame.

13. The method according to claim 1, wherein the mounting means of the digital art frame comprises a frame part fixed to the digital art frame and a wall part fixed to the wall or to be fixed to the wall, wherein the digital art frame can be removably fixed with the frame part to the wall part in two orientations, wherein the two orientation have 90° difference between them.

14. The method according to claim 1, wherein a first digital art frame as the digital art frame has a first electronic paper display as the electronic paper display with first characteristics, and a second digital art frame has a second electronic paper display with second characteristics being different from the first characteristics, wherein the processing of the digital art image comprises a first processing of the digital art image to obtain a first processed digital art image and a second processing of digital art image to obtain a second processed digital art image, wherein the first processing and the second processing, respectively, reduces the number of intensity levels of the digital art image and comprises a dithering processing of the digital art image, wherein the processed first digital art image is transferred to and displayed on the first digital art frame, wherein the processed second digital art image is transferred to and displayed on the second digital art frame.

15. The method according to claim 1, wherein the processing of the digital art image comprises the steps of:
displaying the processed digital art image on an auxiliary electronic paper display being equal to the electronic paper display in the digital art frame,
taking a photo of the processed digital art image displayed on the auxiliary electronic paper display,
comparing the photo with the digital art image resulting in a comparison result, and using the comparison result for determining the quality of the processed digital art image.

16. The method according to claim 1, wherein the mounting means is configured to fix the digital art frame in two orientations at the wall, wherein the two orientations have 90° difference between them, wherein the orientation of the digital art frame is detected, wherein a plurality of processed digital art images are transferred to a plurality of digital art frames, wherein the processed digital art images are distributed to the plurality of digital art frames depending on a detected orientation of the digital art frames.

17. The method according to claim 16, wherein the digital art frame comprises an orientation sensor for detecting the orientation of the digital art frame.

18. The method according to claim 1, wherein the electronic paper display consumes only energy for changing the displayed image and not for the time of the displaying itself.

19. The method according to claim 1, wherein the processed digital art image displayed on the electronic paper display is a grey scale image.

20. A system for presenting a digital art image comprising a server and a digital art frame, wherein the digital art frame comprises an electronic paper display with a number of intensity levels, wherein the digital art frame comprises a mounting means configured to fix the digital art frame on a wall, wherein the server is configured to store a plurality of processed digital art images, wherein the processed digital art images have the same number of intensity levels as the electronic paper display, wherein the processed number of intensity levels is at least four, wherein the processed digital art images stored on the server being dithered by a dithering processing, wherein the system is configured to transfer the selected processed digital art image to the digital art frame and to display the transferred processed digital art image on the electronic paper display of the digital art frame, wherein the processed digital art image displayed on the electronic paper display is a still image.

21. The system according to claim 20 comprising further an intermediate device, wherein the intermediate device is configured to select on the server one of the processed digital art image to be displayed on the digital art frame and the system is configured to transfer the selected processed digital art image to the digital art frame.

22. The system according to claim 20, wherein the digital art frame comprises a first wireless communication interface for connecting to a local network, wherein the digital art frame is connected over the local network to the internet, wherein the digital art frame comprises a second communication interface for configuring the first wireless communication interface, wherein the intermediate device comprises a software which is configured to do one or more of the following first actions: to allow the user to select processed digital art images to download/transfer from the server to the digital art frame; to distribute automatically a plurality of digital art images to a plurality of digital art frames; to detect the orientation of the digital art frame on the wall, wherein the software of the intermediate device is further configured to do at least one second action comprising the configuration of the first wireless communication interface of the digital art frame for connecting to the local network over the second wireless communication interface of the digital art frame, wherein the intermediate device is configured to perform the one or more of the first actions on the server through a first communication interface of the intermediate device and is configured to perform the one or more second actions on the digital art frame through a second communication interface.

* * * * *